O. H. BJUR.
WEED CUTTING MACHINE.
APPLICATION FILED NOV. 2, 1914.
1,154,364.
Patented Sept. 21, 1915.
3 SHEETS—SHEET 1.
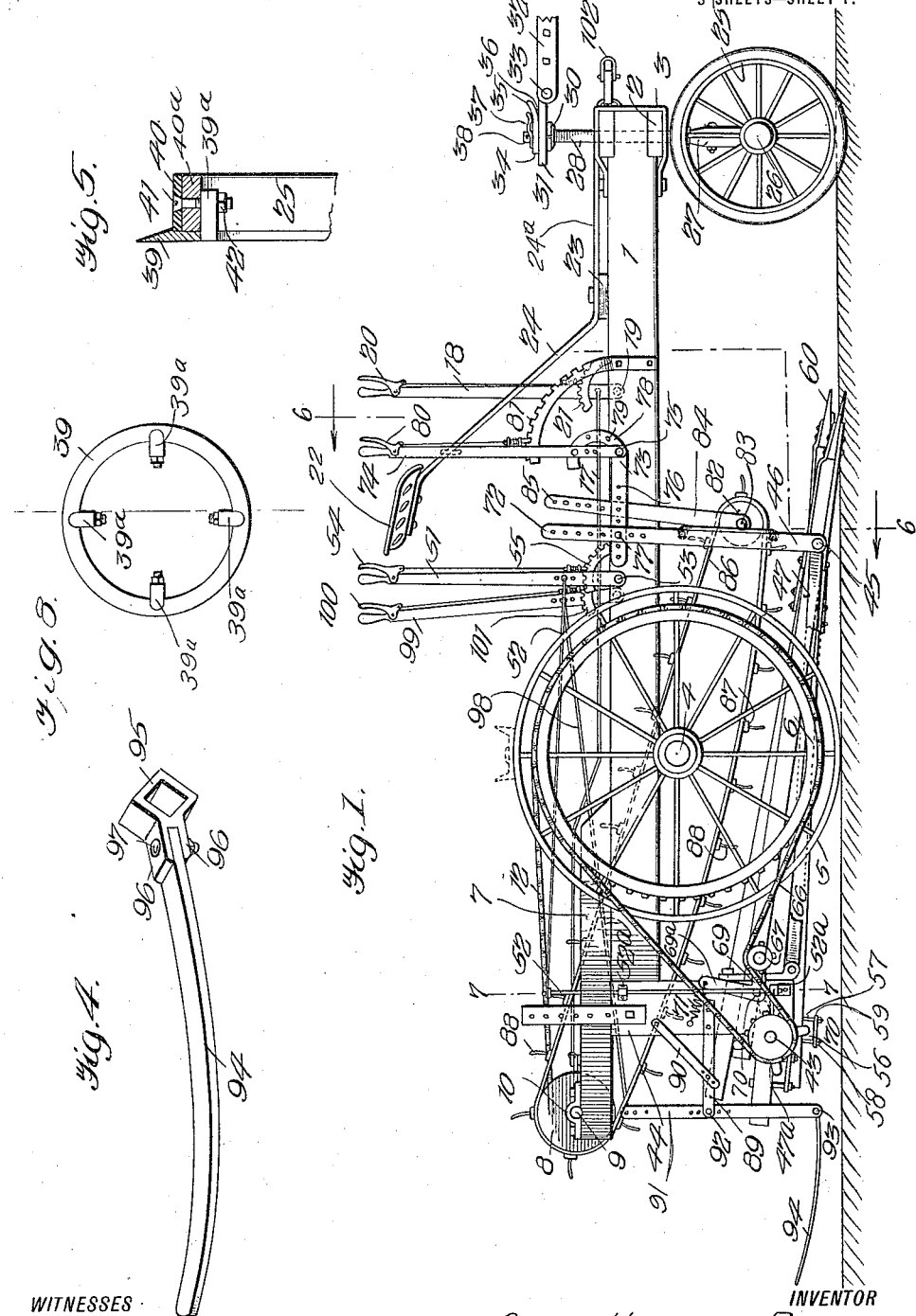
WITNESSES
E. M. Callaghan
C. E. Trainor
INVENTOR
OSCAR HJALMAR BJUR,
BY Munn & Co.
ATTORNEYS

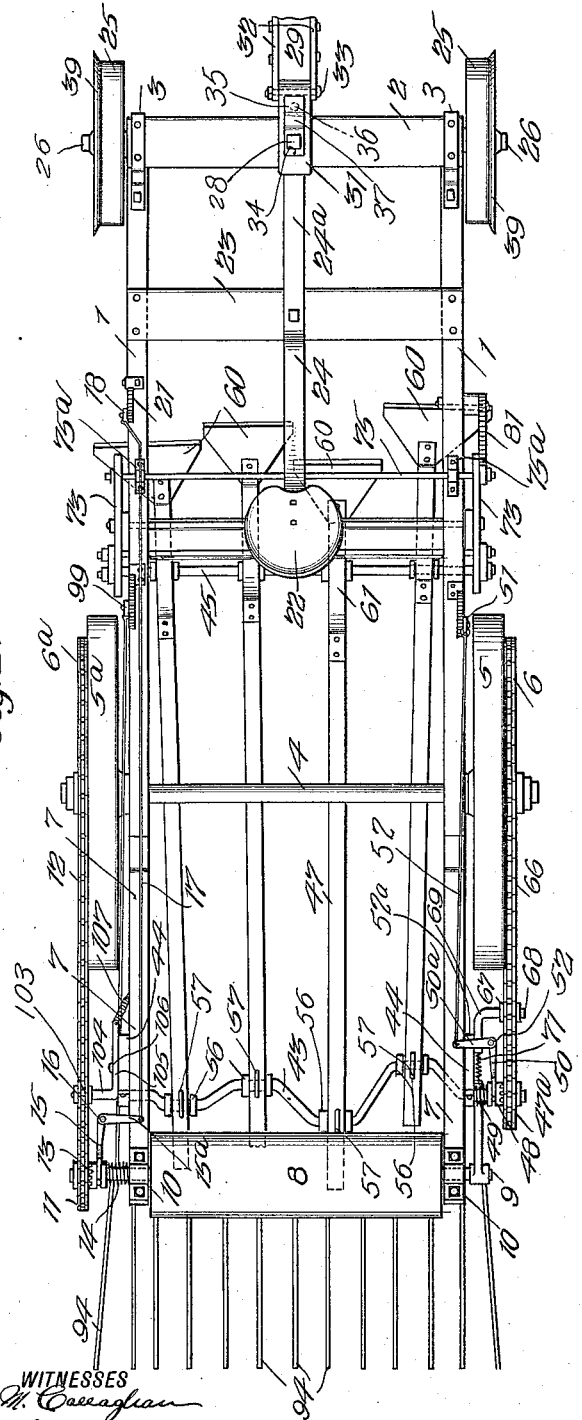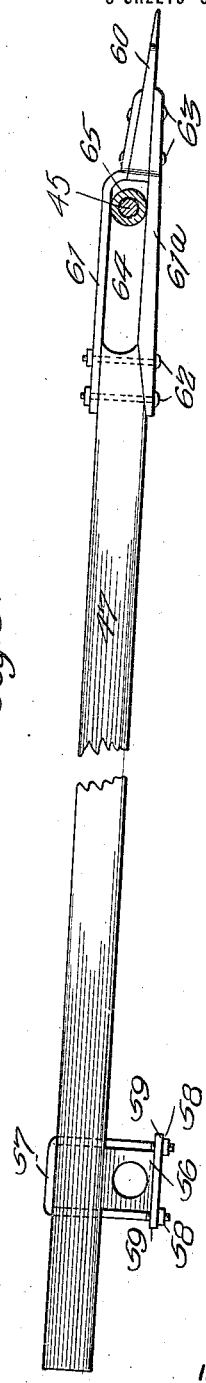

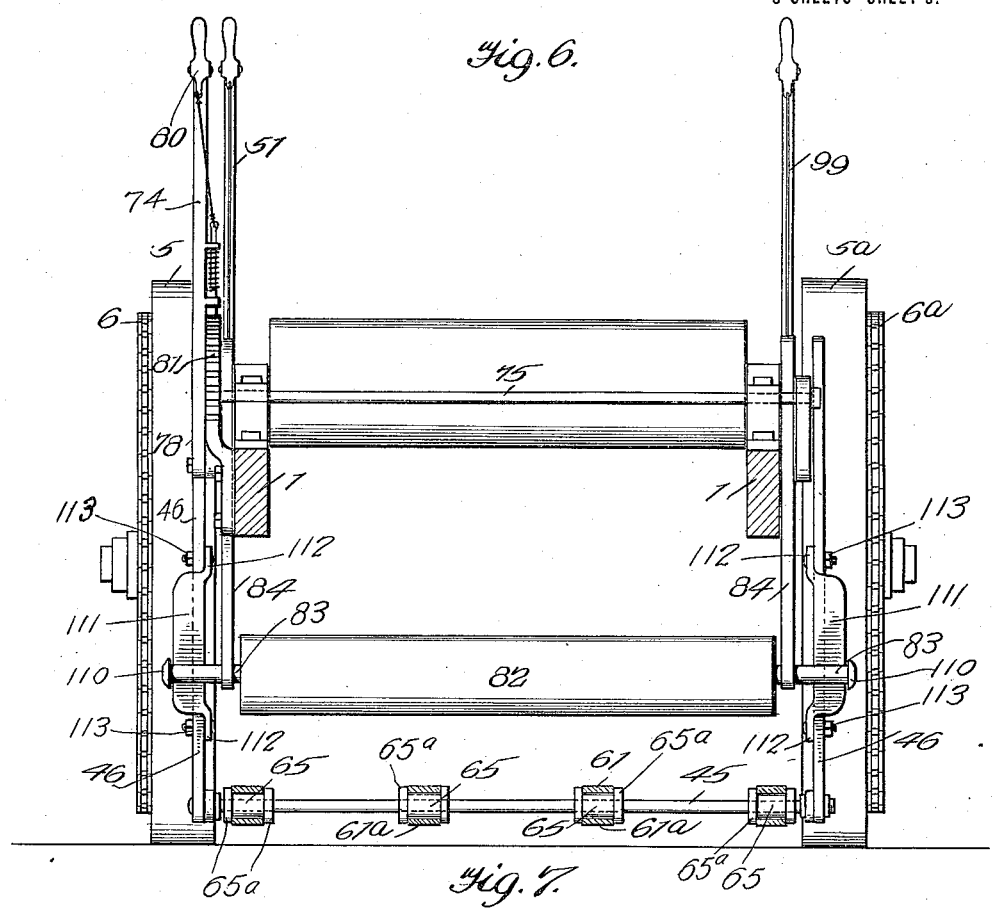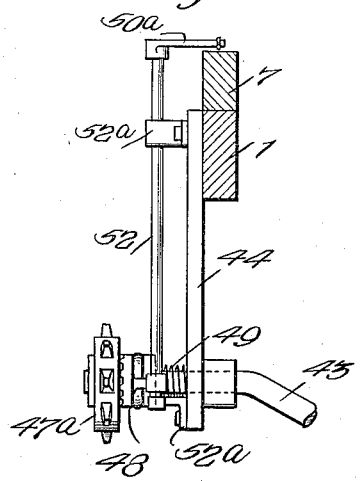

UNITED STATES PATENT OFFICE.

OSCAR HJALMAR BJUR, OF KENNEWICK, WASHINGTON.

WEED-CUTTING MACHINE.

1,154,364. Specification of Letters Patent. Patented Sept. 21, 1915.

Application filed November 2, 1914. Serial No. 869,813.

*To all whom it may concern:*

Be it known that I, OSCAR HJALMAR BJUR, a citizen of the United States, and a resident of Kennewick, in the county of Benton and State of Washington, have invented a new and useful Improvement in Weed-Cutting Machines, of which the following is a specification.

My invention is an improvement in weed cutting machines, and has for its object to provide a machine of the character specified, wherein mechanism is provided for separating a strip of soil from the remaining soil, and wherein other mechanism is provided for cutting beneath the strip and removing the soil in sections, the said mechanism being arranged to deliver the cut soil to a conveyer, which in turn delivers it to a dropper, the dropper being arranged to be operated at will to drop the load at any desired point.

In the drawings, Figure 1 is a side view of the improved machine, Fig. 2 is a top plan view, Fig. 3 is an enlarged side view of one of the cutting elements and its support, Fig. 4 is a perspective view of one of the fingers of the dropper, Fig. 5 is a sectional view of a modified construction of wheel, Figs. 6 and 7 are sections on the lines 6—6 and 7—7, respectively, of Fig. 1, Fig. 6 looking in the direction of the arrows adjacent to the said line, and Fig. 8 is a front view of the ring shown in Fig. 5.

The present embodiment of the invention consists of a frame composed of side members 1, connected at their front ends by upper and lower cross plates or bars 2. A substantially U-shaped brace 3 is arranged at the front end of each side bar, each brace encircling the cross plates and the end of the bar.

An axle 4 is journaled transversely of the side bars near their rear ends, and wheels 5 and 5$^a$ are secured to the ends of the axle outside of the frame. A ring is arranged on the outer face of each wheel concentric therewith, and the rings 6 and 6$^a$ are provided with sprocket teeth on their peripheries.
An extension plate 7 is secured to each side bar at the rear end, and each extension plate extends rearwardly beyond the adjacent side bar. A roller 8 is supported between the extension plates at their rear ends, the roller being secured to a shaft 9, which is journaled in sectional bearings 10 on the upper faces of the plates.

A sprocket wheel 11 is arranged on that end of the shaft adjacent to the wheel 5$^a$, and a sprocket chain 12 connects the wheel with the ring 6$^a$. The sprocket wheel 11 is loosely journaled on the shaft, and the hub of the wheel is provided with one section of a clutch. The other section of the clutch is on a sleeve 13, which is mounted to move longitudinally of the shaft toward and from the sprocket wheel and is feathered thereto and is normally pressed toward the wheel by a coil spring 14, which encircles the shaft between the extension plate and the sleeve.

An elbow lever, consisting of arms 15 and 15$^a$, is pivoted at 16 adjacent to the sprocket wheel and the arm 15 of the sprocket wheel has a fork which engages an annular groove in the sleeve. A link 17 has one end connected to the arm 15$^a$ of the elbow lever, and the other end of the link is connected to a lever 18, which is pivoted at one end as indicated at 19, to the adjacent side plate. The lever is provided with the usual latch mechanism 20, for coöperation with a toothed sector 21, supported by the side plate or bar for holding the lever in adjusted position.

It will be evident that by the proper manipulation of the lever, the sprocket wheel 11 may be clutched to the shaft or detached therefrom to cause the roller 8 to rotate with the axle, or to stand idle as may be desired. The lever 18 is arranged adjacent to a seat 22, which is supported from a cross bar 23, which connects the side bars 1 near their front ends by means of a spring plate 24, and the plate is extended forwardly beyond the cross bar 23, as indicated at 24$^a$ to a connection with the uppermost cross bar or plate 2.

The front end of the frame is supported by wheels 25, which are journaled on spindles 26, at the ends of an arch bar 27. A journal pin 28 extends upwardly from the center of the arch bar through the cross plates 2 and a tongue 29 is connected with the upper end of the journal pin.

A collar 30 encircles the journal pin near its upper end, and the tongue is pivoted to a plate 31, which is provided with an opening for receiving the pin and is arranged directly above the collar. The tongue is provided with side or fish plates 32, arranged on opposite sides thereof, and the fish plates have openings for receiving the bolt 33, which connects them to the plate 31. The tongue is thus hinged to the plate 31 to swing on a horizontal axis, and by swinging the tongue laterally the journal pin 28 will be oscillated to swing the wheels 25 to guide the machine.

The plate 31 is locked to the shaft, by means of a washer 34 arranged above the said plate. The journal pin 28 is squared above the plate 31 and the opening through the washer 34 is shaped to fit the squared portion. The washer has a hinged extension 35 at its front end and the extension is provided with a pin 36, which engages an opening in the plate 31, to lock the plate to the journal pin.

A spring 37 is arranged on the journal pin above the washer, the free end of the spring normally bearing against the extension 35 to prevent disengagement of the pin, and a cotter pin 38 or the like is arranged transversely of the journal pin above the spring.

The wheels are preferably provided with a knife edge at the outer edge of their peripheries. As shown in Fig. 5, the knife edge is at the periphery of a ring 39. The ring 39 is provided with four inwardly extending lugs 39ª fitting within the felly 40ª of the wheel, and each lug is provided with an opening registering with the opening in the felly.

Screw bolts 41 are passed through the fellies and through the lugs and are engaged by nuts 42 inside the felly to hold the ring in place. The wheel is provided with the usual metallic tire 40, the said tire being also held in place by the screw bolts 41 and the nuts 42. The bevel of the ring which forms a cutting edge is on the inner side thereof.

A crank shaft 43 is journaled in hangers 44, depending from the rear ends of the bars 1, and between the bars the crank shaft is provided with a series of cranks, four cranks being provided in the present instance. A shaft 45 is journaled below the frame intermediate the ends thereof, in hangers 46, and a series of bars 47 is supported by the shafts 43 and 45, the said bars being operated by the crank shaft 43.

One end of the crank shaft is extended beyond the adjacent side bar, and a sprocket wheel 47ª is journaled loosely on the extended end. The hub of the sprocket wheel is provided with one section of clutch, the other section being on the outer end of a sleeve 48, which is feathered to the shaft and is mounted for sliding movement toward and from the sprocket wheel.

A coil spring 49 encircles the shaft at the sleeve, and normally acts to press the sleeve outwardly toward the sprocket wheel. The sleeve 48 is provided with an annular groove, which is engaged by a fork on the end of an arm 50, which extends radially from the shaft 52, journaled in bearings 52ª on the adjacent hanger 44. At its upper end the shaft is provided with another arm 50ª extending at a right angle to the arm 50, and a link 52 connects the said arm with a lever 51, pivoted to the adjacent side bar 1, as indicated at 53, and provided with latch mechanism 54, for coöperating with a toothed sector 55, secured to the side bar for holding the lever in adjusted position.

It will be evident that by the proper manipulation of the lever 51, the sprocket wheel 47ª may be released from the shaft. The coil spring 49 normally holds the clutch sections in contact. Each of the bars 47 before mentioned, is connected to a crank of the shaft 43, by means of a bearing block 56. Each of the bearing blocks 56 is arranged on the under side of the bar near its rear end and is secured to the bar by a U-shaped clip 57, whose arms pass downwardly through the bar and the block on opposite sides of the shaft and are engaged by nuts 58, below a cross plate 59. The cross plate has openings through its ends for receiving the arms and the nuts are threaded on to the arms below the plate.

A cutting blade 60 of approximately triangular shape is secured to the front end of each of the bars 47. Each of the blades 60 is of approximately hoe shape, and the base of the blades are the cutting edges and are arranged forwardly. The blades as shown in Fig. 3 gradually increase in thickness from the base to the apex, and plates 61 and 61ª are provided for connecting the blades to the front end of the bar.

The plates 61 and 61ª are connected to the bar by means of bolts and nuts 62, and to the blade by means of rivets 63 or the like. The plates are spaced apart between the blade and the front end of the bar to form a guideway 64, for receiving a roller 65 on the shaft 45.

The rollers as shown more particularly in Fig. 6, are flanged or ribbed at their ends as indicated at 65ª to prevent lateral movement of the front end of the bar with respect to the shaft. The shaft 43 is rotated by means of a sprocket chain 66, which connects the sprocket wheel 47 with the sprocket wheel 6 of the wheel 5.

The sprocket chain is tensioned by means of an idler 67, which is journaled on a journal pin 68, extending laterally from one of the arms 69 of an elbow lever pivoted at 70 to the adjacent hanger 44. The other arm 69ª of the elbow lever is engaged by one end of a spring 71, whose other end is connected to the hanger. The spring acts normally to press the idler upward, and the lower run of the sprocket chain 66 passes over the idler.

The hangers 46 of the shaft 45 are provided at their upper ends with longitudinally extending series of openings 72. A shaft 75 is journaled transversely of the frame in bearings 75ª, and a plate 73 is secured to each end of the shaft. Each plate is provided with a longitudinally extending series of openings 76, one of which is adapted to register with one of the openings 72 of the adjacent hanger 46, and the hanger is pivoted to the plate by means of a bolt and nut 77.

A lever 74 is secured to the shaft 75 and the lever is provided with the usual latch mechanism 80, for coöperating with a toothed sector 81, for holding the lever in adjusted position. It will be evident that when the shaft is oscillated in the proper direction, the hangers will be raised or lowered. The plate 73 adjacent to the lever 74 is provided with a curved extension 78, which is connected to the lever 74 directly above the shaft 75.

A roller 82 is arranged above the front ends of the bars 47 transversely of the frame, and the roller is secured to a shaft 83, which is journaled at its ends with hangers 84. Each hanger is provided at its upper end with a longitudinally extending series of openings 85, one of which is adapted to register with one of the openings 76 of the adjacent plate 73, and the registering openings are adapted to receive a bolt for pivoting the hangers to the plate. The roller is thus adjusted with the front ends of the bars 47, the lever 74 operating both the roller and the shaft 45.

The roller 82 is connected to the roller 8 before mentioned, by means of an endless belt 86. The belt is provided on its outer face with a series of transversely arranged spaced slats 87, and each slat is provided with a series of outwardly extending spurs 88. Each of the spurs is curved, and all of the spurs are similarly arranged, in such manner that on the upper run of the belt, the convex surface of the spurs are forwardly.

Bracket arms 89 extend rearwardly from the hangers 44, intermediate their ends, and each arm is braced against the hanger by an inclined brace 90. Levers 91 are pivoted to the bracket arms, each lever having intermediate its ends a series of openings as shown in Fig. 1, for engagement by a bolt or pivot pin 92 connected with the bracket arm. At their lower ends the levers are connected by a shaft 93, which is polygonal in cross section, and a series of fingers 94 is connected with the shaft. Each of the fingers is provided at one end with a bearing collar 95, fitting the shaft, and each collar is provided with a pair of parallel lugs 96, between which the end of the finger is received, and a bolt and nut 97 is provided for connecting the lugs to the fingers. The fingers are curved and all are arranged with their concave faces upwardly.

A link 98 connects the upper end of one lever 91 with a lever 99, which is pivoted to the frame at its lower end, and is provided with the usual latch mechanism 100, for coöperating with a toothed sector 101, for holding the lever in adjusted position. By moving the lever 99 in the proper direction, the levers 91 may be oscillated to raise or lower the fingers 94. The said fingers 94 constitute a dropper or carrier for receiving the weeds after they have been cut and for holding the cut weeds until a load has collected upon the dropper. When this occurs the dropper is operated to release the load. The dropper or carrier is immediately below the roller 8, so that the endless carrier supported by the rollers 8 and 82 delivers to the dropper.

A clevis 102 is provided at the front of the frame, for connecting draft apparatus, the clevis being connected with one of the cross plates 2. Means is also provided for tensioning the sprocket chain 12. The said means comprises an idler sprocket 103, which is journaled on a journal pin 104, extending laterally from one arm 105 of an elbow lever, consisting of the arm 105 and an arm 105ª, arranged at an angle to the said arm 105. The elbow lever is pivoted to the adjacent hanger 44, as indicated at 106, and a coil spring 107 is arranged between the arm 105 and the frame, the spring acting normally to press the roller 103 against the lower run of the sprocket chain.

The operation of the machine, as a whole, is as follows:—The machine is drawn through the field in any desired manner with the shaft 45 adjusted in such manner that the blades 60 will cut at the required depth; the depth at which the said blades cut should be approximately the same as the depth at which the flanges 39 of the wheels 25 cut. The sprocket wheels 11 and 47ª are normally clutched to their respective shafts, and since the said sprocket wheels are connected with the sprocket rings of the supporting wheels for the machine, the roller and the shaft will be rotated to operate the endless carrier and the cutting mechanism. The bars 47 are reciprocated and the blades are raised and lowered, swinging on the shaft 45. As the rear end of each bar 47 attains its highest point, the blade supported thereby is at its lowest point and at this moment the blade begins to move forwardly in the direction of motion of the machine. The blade is forced beneath the surface of the soil, operating in a manner very closely resembling that of a hand operated hoe. Each blade cuts loose a section of soil and lifts the same upwardly. The block of soil adheres together because of the grass roots, and each block as it is lifted is thrown on to the endless carrier or is thrown into position to be engaged by the spurs 88 thereof, which carry it on to the upper run of the carrier. As the blocks move rearwardly the soil drops away and the grass is carried to the rear end of the carrier and dropped on to the dropper or carrier consisting of the fingers 94. The blade 60 may be adjusted to cut to any desired depth and the front end of the elevator may be adjusted with respect to the blades as well as with the blades. When a sufficient load has collected upon the dropper, the operator releases the lever 99 from the sector 101, and swings the said lever rearwardly, thus throwing the free ends of the fingers 94 downwardly and permitting the load to slip off the said fingers. The cut weeds may be arranged in windrows in this manner in convenient position for collection.

The height of the dropper may be adjusted by means of the series of openings in the levers 91. Either the roller 8 or the crank shaft 43 may be released from the driving wheels by means of the proper lever. As the machine is drawn through the field, the flanges 39 of the front wheels cut a strip of soil loose from the soil at each side of the path traversed by the machine, and the aggregate width of the cutting edges of the blades 60 is equal to the distance between the flanges 39 of the wheels. Thus a strip of soil which is to be lifted by the cutting blades is separated by the front wheels before the strip is engaged by the cutting blades.

When the flanges 39 become dull or worn, they may be removed for sharpening, or for replacement by releasing the nuts 42. It will be noted from an inspection of Fig. 6 that the ends of the shaft 83 to which the roller 82 is secured are extended outwardly past the hangers 46, and each end of the shaft is headed at its outer end as indicated at 110. Wear or friction plates 111 are secured to the respective hangers 46 at the extended ends of the shaft for engagement by the said ends. These wear plates have lugs 112 lapping upon the inner faces of the hangers, and each lug is secured to the hanger by means of a bolt and nut 113. The wear plates have a wide surface against which the extended ends of the shaft move, and the heads 110 engage outside of the outer edges of the said surfaces to limit longitudinal movement of the shaft 82.

I claim:—

1. In a machine of the character specified, a main frame having a radial flange provided with a cutting edge, wheels for supporting the rear end of the frame, cutting mechanism for separating the top layer of soil between the cuts made by said flanges, an endless carrier above the cutting mechanism for receiving the soil and conveying it rearwardly, and dropping mechanism supported at the rear of the frame for receiving the cut soil from the conveyer, and manually operated means for operating the dropper mechanism.

2. A machine of the character specified, comprising a main frame, wheels for supporting and guiding the frame, a shaft arranged transversely of the frame intermediate the ends thereof, means connected with the frame for supporting the shaft, means for adjusting the shaft vertically with respect to the frame, a crank shaft journaled at the rear of the frame below the same and having a series of cranks, said cranks being spaced apart angularly at equal distances, a bar for each crank, each bar having a bearing for engaging the crank and having at its front end a longitudinally extending slot through which the first-named shaft extends, a driving connection between the crank shaft and the wheels, and a cutting blade at the front end of each bar, each of the cutting blades being approximately triangular and having its base forward and sharpened to cut, dropping mechanism at the rear of the frame, means for operating the dropping mechanism, and a conveyer for receiving the cut soil from the blades and delivering it to the dropper.

3. A machine of the character specified, comprising a main frame, wheels for supporting and guiding the frame, a shaft arranged transversely of the frame intermediate the ends thereof, means connected with the frame for supporting the shaft, means for adjusting the shaft vertically with respect to the frame, a crank shaft journaled at the rear of the frame below the same and having a series of cranks, said cranks being spaced apart angularly at equal distances, a bar for each crank, each bar having a bearing for engaging the crank and having at its front end a longitudinally extending slot through which the first-named shaft extends, a driving connection between the crank shaft and the wheels, and a cutting blade at the front end of each bar, dropping mechanism at the rear of the frame, means for operating the dropping mechanism, and a conveyer for receiving the cut soil from the blades and delivering it to the dropper.

4. A machine of the character specified, comprising a main frame, wheels for supporting and guiding the frame, a shaft arranged transversely of the frame intermediate the ends thereof, means connected with the frame for supporting the shaft, means for adjusting the shaft vertically with respect to the frame, a crank shaft journaled at the rear of the frame below the same and having a series of cranks, said cranks being spaced apart angularly at equal distances, a bar for each crank, each bar having a bearing for engaging the crank and having at its front end a longitudinally extending slot through which the first-named shaft extends, a driving connection between the crank shaft and the wheels, and a cutting blade at the front end of each bar, each of the cutting blades being approximately triangular and having its base forward and sharpened to cut.

5. A machine of the character specified, comprising a main frame, wheels for supporting and guiding the frame, a shaft arranged transversely of the frame intermediate the ends thereof, means connected with the frame for supporting the shaft, means for adjusting the shaft vertically with respect to the frame, a crank shaft journaled at the rear of the frame below the same and having a series of cranks, said cranks being spaced apart angularly at equal distances, a bar for each crank, each bar having a bearing for engaging the crank and having at its front end a longitudinally extending slot through which the first-named shaft extends, a driving connection between the crank shaft and the wheels, and a cutting blade at the front end of each bar.

6. A machine of the character specified, comprising a frame, wheels for supporting the rear of the frame, dropping mechanism supported by the frame at the rear thereof, means for operating the dropping mechanism, a crank shaft journaled below the frame at the rear thereof and provided with a series of cranks spaced apart at equal angular intervals, a shaft arranged transversely of the frame below the same near the front thereof, means for supporting and adjusting the said shaft vertically with respect to the frame, a bar journaled on each crank of the crank shaft at its rear end, each bar having a longitudinal slot at its front end through which the shaft extends, a cutting blade secured to the front end of each bar, a releasable driving connection between the crank shaft and the supporting wheels, an endless conveyer supported for movement longitudinally of the frame above the bars for receiving the material cut by the blades and delivering it to the dropping mechanism, front wheels for supporting the front end of the frame, a pivotal connection between the wheels and the frame for permitting the wheels to be swung to guide the frame, each wheel having a radial flange provided with a cutting edge, the aggregate width of the blades being approximately equal to the distance between the flanges of the front wheels.

7. A machine of the character specified, comprising a frame, wheels for supporting the rear of the frame, a roller journaled transversely of the frame at the rear thereof, dropping mechanism supported by the frame below the roller, means for operating the dropping mechanism, a crank shaft journaled below the frame at the rear thereof and provided with a series of cranks spaced apart at equal angular intervals, a shaft arranged transversely of the frame below the same near the front thereof, means for supporting and adjusting the said shaft vertically with respect to the frame, a bar journaled on each crank at the crank shaft at its rear end, each bar having a longitudinal slot at its front end through which the shaft extends, a cutting blade secured to the front end of each bar, and a releasable driving connection between the crank shaft and the supporting wheels, and an endless conveyer supported for movement longitudinally of the frame above the bars for receiving the material cut by the blades and delivering it to the dropping mechanism.

8. A machine of the character specified, comprising a main frame, supporting wheels for the frame intermediate the ends thereof, an endless carrier arranged to move longitudinally of the frame, a dropping device at the rear of the frame to which the carrier delivers, an axle pivoted at the front of the frame, wheels on the axle, each wheel having a cutting flange and reciprocating cutting blades supported by the frame and mounted to move toward and from the cutting wheels to cut the top layer of soil and deliver it to the conveyer, and driving connections between the support, the endless conveyer and the cutting mechanism.

OSCAR HJALMAR BJUR.

Witnesses:
C. H. HOLCOMB,
KATHLEEN HUDNUTT.